(No Model.)
T. T. MILLER.
SEEDING MACHINE.
No. 273,755. Patented Mar. 13, 1883.
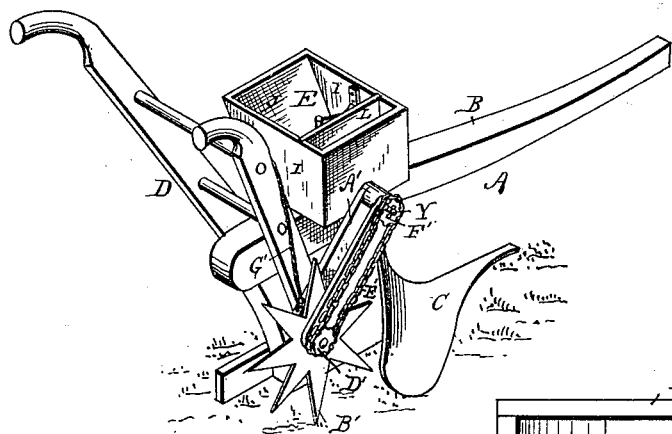
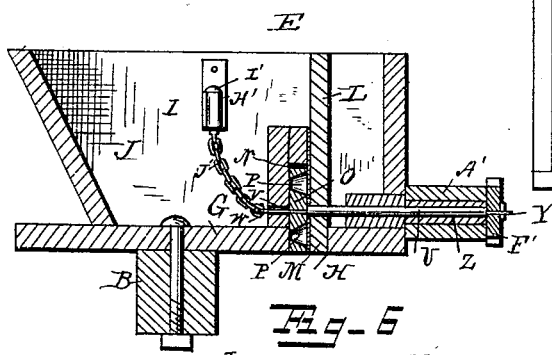
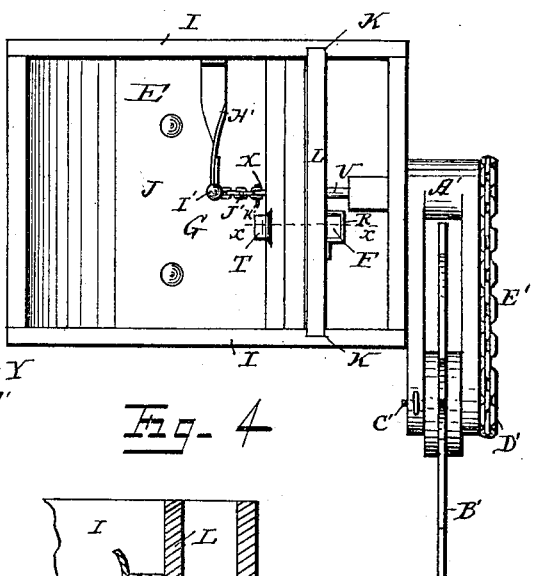
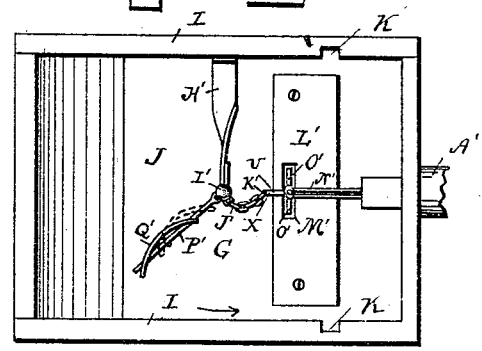
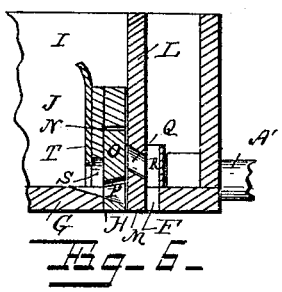
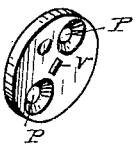
WITNESSES
F. L. Ourand
J. Reed Littell
INVENTOR
T. T. Miller
by C. A. Snow & Co.
Attorneys

UNITED STATES PATENT OFFICE.

TEDOR T. MILLER, OF HICO, TEXAS.

SEEDING-MACHINE.

SPECIFICATION forming part of Letters Patent No. 273,755, dated March 13, 1883.

Application filed October 21, 1882. (No model.)

*To all whom it may concern:*

Be it known that I, TEDOR T. MILLER, a citizen of the United States, residing at Hico, in the county of Hamilton and State of Texas, have invented a new and useful Seeding-Machine, of which the following is a specification, reference being had to the accompanying drawings.

This invention relates to seeding-machines, and has for its object to provide a simple and efficient machine that will plant all kinds of grain or seed, and in which the mechanism can be readily and conveniently changed to adapt it to the different kinds of seed.

In the drawings, Figure 1 is a perspective view of my seeder in position on a plow-beam. Fig. 2 is a vertical transverse sectional view thereof. Fig. 3 is a top view. Fig. 4 is a vertical sectional view on the line $x\,x$, Fig. 3. Fig. 5 is a perspective detail view of the seeding-disk. Fig. 6 is a top view, showing the device adapted for use as a cotton-planter.

Referring to the drawings, A designates a plow of suitable construction, having beam B, mold-board C, and handles D.

E is the seeding-machine, which is to be secured on beam B, with the seed-opening F in its bottom G on the right side of the beam. From the opening F is adapted to extend a suitable chute or tube, so that the seed will be dropped in the furrow. At the side of opening F is an auxiliary opening, H.

The sides I I of the hopper J, which forms the body of seeder E, are provided with vertical grooves K K, one on each side, in which slides the removable partition L. This partition L has an extension, M, at its bottom, which enters opening F when the partition is in place, leaving auxiliary opening H, of course, open. From extension M a recess, N, opens up into partition L, and in this recess is arranged the seed-disk O, which works down into opening F, and is provided with the perforations P for receiving the seed. From the other side of recess N opens the seed-perforation Q, covered by a guide, R, directly over opening H. On the inner side of the partition is formed another opening, S, extending into recess N, and having its size regulated by a slide, T. The seed is received into the perforations P through opening S, and is carried around to the opening Q by the disk, from whence it is dropped through opening H. The distance between the seed when they are dropped is regulated by the number of perforations on the disk—the greater the number of perforations the less distance there will be between the seed. The disk is driven by a rotary shaft, U, on which it is fixed by having a rectangular central opening, V, passing over a correspondingly-shaped portion, W, of shaft U. This shaft U passes through the partition L, and has a projecting inner end, X, while its outer end, Y, has a bearing in a spindle, Z.

On spindle Z is hinged a rearwardly-extending bifurcated standard, A', between the arms of which is journaled a walking-wheel, B', the shaft C' of which carries a chain-pulley, D', which is connected by a chain belt, E', with a chain-pulley, F', on shaft U. Thus the latter is driven by walking-wheel B', and this wheel travels on the right side of the plow-beam, and, being journaled in the hinged bracket or standard, will automatically and readily accommodate itself to unevenness of the ground. The bracket may be elevated, so as to lift the wheel entirely off the ground, by means of a rope or cord, G', extending to the handle.

H' is a bracket projecting on the inside of the hopper, and having a pin, I', swiveled in its end. To said pin is secured a chain, J', having its free end attached by a long pin, K', to the end X of shaft U. As the latter revolves the pin K' and chain J' will stir the seed at the mouth or opening S, said chain being caused to twist, when its swivel-pin will turn.

When it is desired to use my improved seeding-machine as a cotton-planter the shaft U is drawn out, after being disconnected from the chain, and the partition L is also removed. The openings F H are now covered by a plate, L', having seed-opening M', and rod U is reinserted, a collar, N', having radial arms O', being placed on said shaft to feed the cotton-seed through opening M'. The chain J' is again connected to the end of shaft U by the pin K'. To prevent the chain from becoming clogged or crowded in the seed, a lateral arm, P', is secured to the bottom of pin I', and carries at its outer end a dished disk, Q', which will turn with the chain and loosen the seed. This disk Q' is adjustable on arm P'.

The advantages of my invention will be readily understood. It is simple, convenient, and efficient.

I claim as my invention—

1. The combination, with the shaft of the seed-feeding mechanism U, having a rotary motion, of the removable chain secured to the end thereof and swiveled at the other end, as set forth.

2. The combination of the hopper having the seed-opening, over which is arranged the rotary shaft of the seed-feeding mechanism, the lateral bracket H', inside the hopper, the pin swiveled in the end of the bracket H', and the chain J, removably secured to the end of the rotary shaft to stir the seed at the mouth of the seed-opening, as set forth.

3. The combination of the hopper adapted to be secured on a plow-beam, and having stub shaft or spindle Z, the rotary shaft U, extending through the latter into the hopper and carrying the chain-wheel, the bifurcated standard A, hinged on spindle Z, and carrying walking-wheel B', the shaft of which has the chain-wheel, the chain belt, and the cord or rope G', as set forth.

4. The combination of the hopper having the seed-opening F and auxiliary opening H, the removable partition L, having extension M, recess N, opening Q, and guide R, the rotary feed-disk O, having seed-perforations P, and fixed on the removable rotary shaft U, as set forth.

5. The combination of the swiveled pin I', detachable chain J', adapted to be secured to the rotary shaft U, and removable lateral arm P', carrying the adjustable circularly-traveling disk Q', as set forth.

In testimony that I claim the foregoing as my own I have hereto affixed my signature in presence of two witnesses.

TEDOR T. MILLER.

Witnesses:
A. K. DUNAGAN,
W. L. GADDIS.